United States Patent [19]

Holmes

[11] 4,160,969
[45] Jul. 10, 1979

[54] TRANSDUCER AND METHOD OF MAKING

[75] Inventor: Edward S. B. Holmes, Barrie, Canada

[73] Assignee: The Garrett Corporation, Los Angeles, Calif.

[21] Appl. No.: 855,045

[22] Filed: Nov. 25, 1977

Related U.S. Application Data

[62] Division of Ser. No. 754,465, Dec. 27, 1976, abandoned.

[51] Int. Cl.² ............................................... H01C 7/00
[52] U.S. Cl. ........................................ 338/23; 29/611;
29/620; 338/309
[58] Field of Search ................ 29/611, 620, 612, 613;
338/22–25, 28, 229, 307–309, 34; 427/102, 103, 124, 126

[56] References Cited

U.S. PATENT DOCUMENTS

| 3,477,055 | 11/1969 | Herbst | 338/22 R |
| 3,748,174 | 7/1973 | Chen | 338/23 |
| 4,031,272 | 6/1977 | Khanna | 29/620 |
| 4,041,440 | 8/1977 | Davis | 29/620 |

Primary Examiner—Lowell A. Larson
Assistant Examiner—Gene P. Crosby
Attorney, Agent, or Firm—Joel D. Talcott; Albert J. Miller

[57] ABSTRACT

A transducer is constructed by the deposition of conductive leads by thick film deposition techniques and the deposition of resistive material on the substrate by thin film deposition techniques in electrical contact with the leads.

8 Claims, 12 Drawing Figures

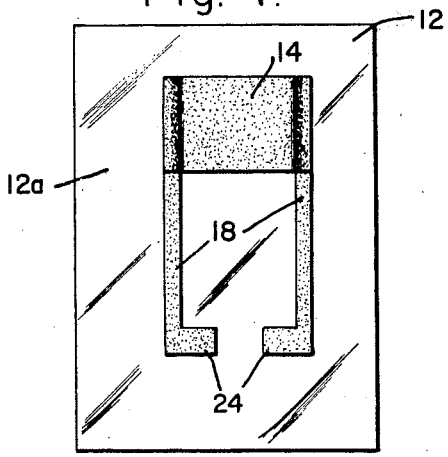
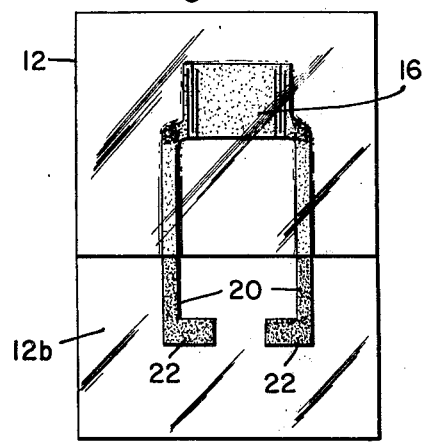
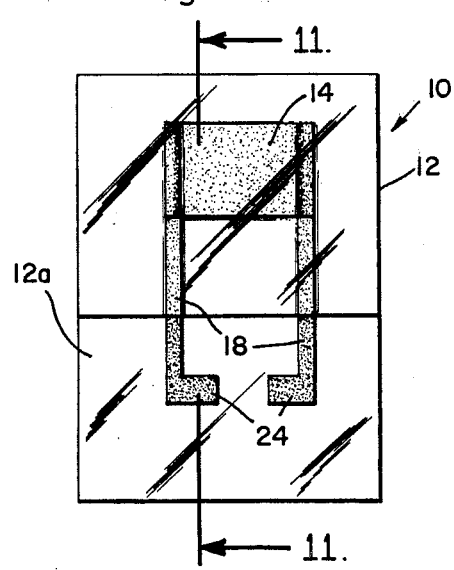
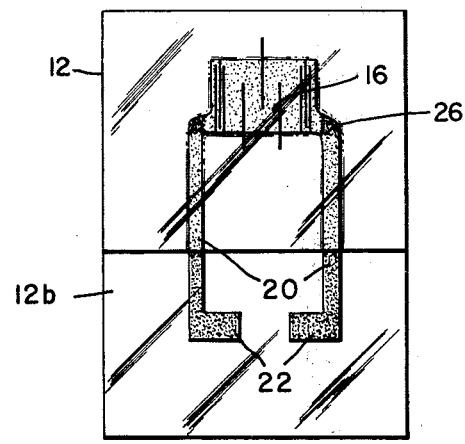
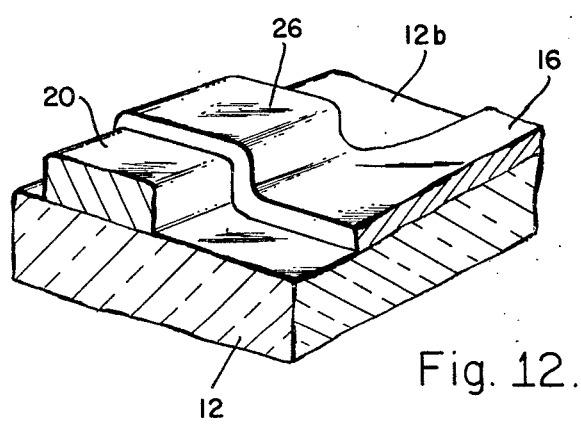
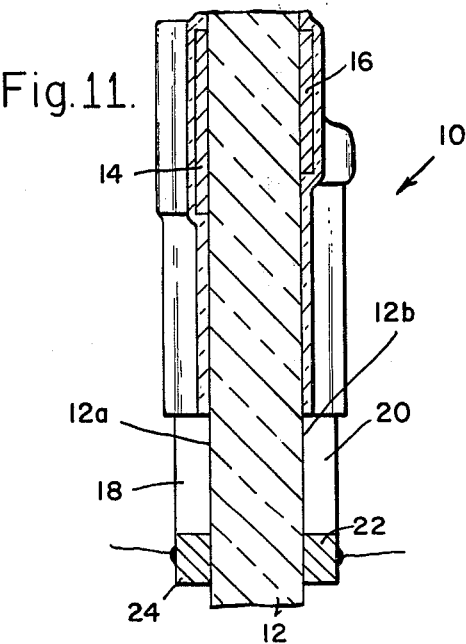

TRANSDUCER AND METHOD OF MAKING

This is a divisional of application Ser. No. 754,465 filed Dec. 27, 1976.

This invention relates generally to transducers and a method of constructing same, and more particularly to a transducer for positioning in a fluid stream for measuring the cooling effect of the stream to provide mass flow rate information.

Heretofore, flow sensor transducers have generally consisted of a thermistor bead operatively associated with a wire-wound heating element. One such device is disclosed in U.S. Pat. No. 3,927,567, issued to Edward A. Novak and George F. Paclik on Dec. 23, 1975, and has provided significant advantage in the measurement of air flow in systems such as that disclosed in U.S. Pat. No. 3,757,808, issued to Frederick L. Peterson and George F. Paclik on Sept. 11, 1973.

In accordance with this invention, an improved transducer is formed by the combination of thick and thin film techniques. Pairs of thick film conductive elements are deposited on each side of a ceramic substrate. A sensor material is deposited on one side of the substrate and heater material coated on the other side of the substrate. The sensor and heater elements are formed by etching the deposited materials. After glass coating, the sensor is laser-trimmed to value.

By this method, an improved transducer is formed which is relatively inexpensive to manufacture and provides substantially increased response time over prior art devices as well as generally symmetrical response. Further, the use of thick film conductive elements permits the soldering of leads to the transducer by conventional, inexpensive techniques instead of the use of expensive and difficult soldering techniques or wire-bonding which would be required by the use of thin film conductive elements.

These and other advantages of the sensor of this invention will be readily apparent when the following specification is read in conjunction with the appended drawings, wherein:

FIGS. 1-10 are a series of plan views illustrating steps in the method of constructing a transducer element in accordance with this invention;

FIG. 11 is a cross-sectional view of a transducer element of this invention taken generally along the line 11—11 of FIG. 9; and FIG. 12 is a fragmentary perspective view of a transducer of this invention illustrating a junction between a thick film conductor element and a thin film resistive element.

Figure 1:
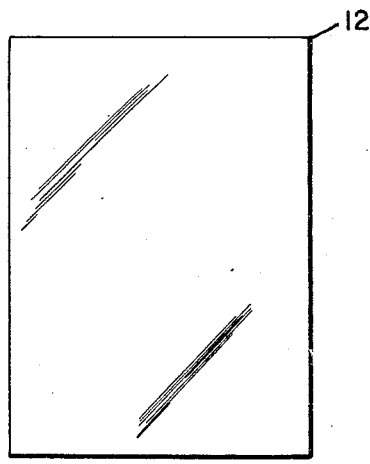

Referring now to the drawings, FIG. 11 illustrates a transducer 10 of this invention which is formed on a substrate 12 having a heater element 14 on a planar surface 12a of the substrate and a sensor element 16 on a planar surface 12b of the substrate. Conductors 18 on the surface 12a permit electrical connection of the heater element 14 while conductors 20 on planar surface 12b facilitate electrical connection of the sensor element 16.

The substrate 12 is preferably of ceramic material and about 0.010 inch thick and has dimensions suitable for the particular application of the transducer. In the preferred embodiment, the substrate is formed of 99.5% Alumina. While the planar surface of each transducer is preferably about 0.15 in×0.5 in, the substrate may be many times that size so that numerous transducers may be formed at once in a manner well known to those skilled in the art. The method steps illustrated in FIGS. 2-10 result in the formation of the transducer 10 illustrated in FIGS. 9-11 having elements on opposed planar sides of the substrate. However, as will be later shown, by utilizing only selected illustrated steps, a transducer having an element on only one side of the substrate may be constructed in accordance with this invention.

As will be seen in the description of the construction of the transducer of this invention, both thin film and thick film elements will be deposited on the same substrate. As is well known to those skilled in the art, substrates utilized for thick film deposition have different surface characteristics than do those utilized for thin film deposition. Due to the more critical nature of the thin film elements of this invention, it is preferred that a substrate designed for thin film elements be utilized.

Figure 2:
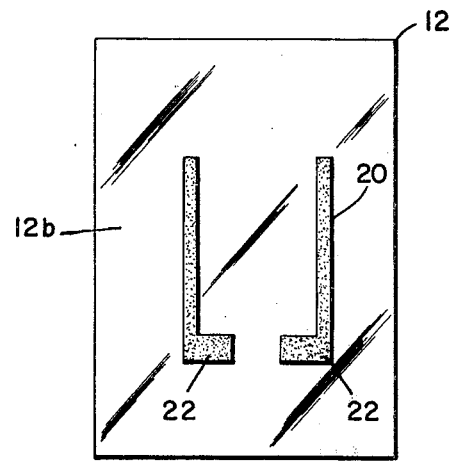
Figure 3:
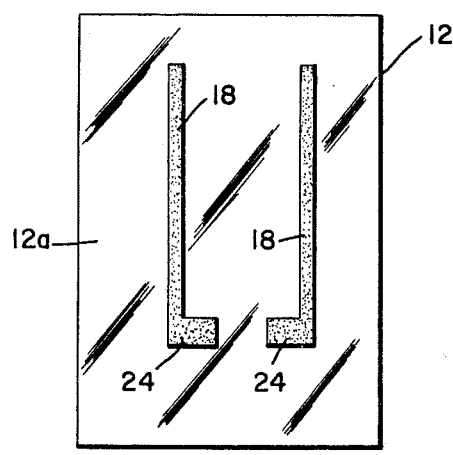

Once the substrate 12 has been prepared for the deposition of elements thereon, conductive elements 18 and 20 will be deposited on opposite sides of the substrate by thick film deposition techniques well known to those skilled in the art. Either side of the substrate may be selected for the deposition of the first set of conductors. For example, FIG. 2 illustrates the deposition of conductors 20 on the surface 12b of the substrate. Soldering pads 22 are formed integrally with the conductors 20. Conductors 18 are then deposited on surface 12a (FIG. 3) of the substrate and have soldering pads 24 formed integrally therewith.

Conductors 18 and 20 are preferably formed by screen printing a platinum/gold conductor alloy on the substrate and firing in a well-known manner. In the preferred embodiment the thick film conductor elements are formed of the commercial product known as DuPont 9596 and have a fired thickness of about 12-18 microns.

Following the deposition of conductive elements on the substrate, the thin film resistive elements are formed. It has heretofore been believed necessary in the prior art to utilize thin film conductors in conjunction with thin film resistive elements. The use of such structure has required the use of expensive and difficult soldering or wire-bonding techniques for external connection to system conductors. However, by utilizing, in accordance with this invention, thick film conductive elements with thin film resistive elements, the advantages of the thin film element can be obtained while forming a transducer which may be easily externally electrically connected by the use of inexpensive standard soldering techniques.

Figure 4:
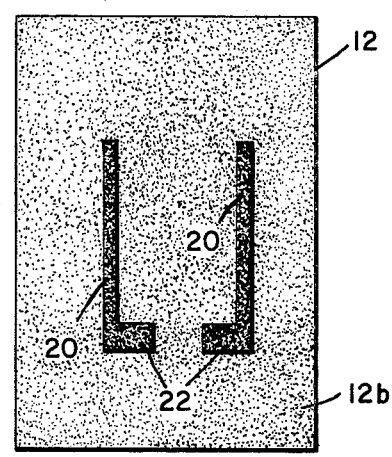

The material for the sensor element is applied to the transducer, as shown in FIG. 4, by depositing a layer of a suitable resistive material on surface 12b of the substrate, coating the conductors 20 as well. In the preferred embodiment, the sensor material is pure nickel having a thickness of about 1,000 Angstroms although a wide range of thickness could be equally satisfactory, depending on the sheet resistance desired.

Figure 5:
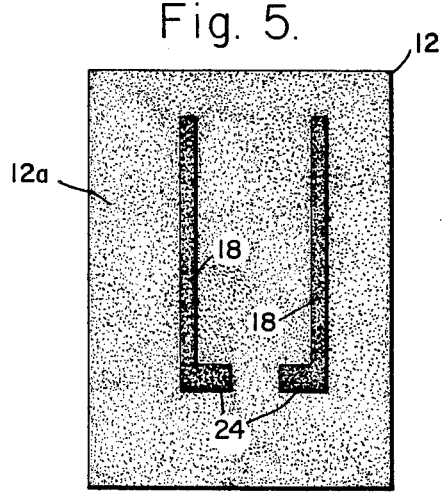
Figure 6:
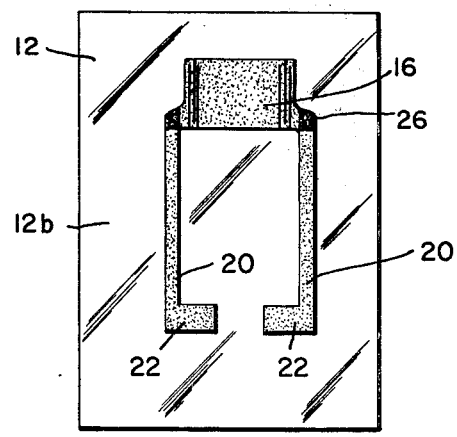

Heater element material is applied by depositing a layer of a suitable resistive material on surface 12a of the substrate, including the conductors 18 (see FIG. 5). In the preferred embodiment nichrome is used as the heater material and is deposited to a thickness of about 500-1000 Angstroms.

The sensor element 16 is formed (see FIG. 6) by etching in a manner well known to those skilled in the art of constructing thin film devices. Etching removes most of the nickel layer from the substrate surface 12b so that that portion remaining is in electrical contact with the conductors 20 and forms a resistance thermometer having a resistance approximately equal to that required for the final element.

As shown in FIG. 7, the heater element 14 is formed by etching the nichrome layer to leave a heater element of suitable size connected between the conductors 18 on the substrate surface 12a.

As shown in FIGS. 8 and 9, the sensor element 16 and heater 14 are protected from mechanical injury by coating a portion of the surfaces 12b and 12a, respectively, with glass. The glass preferably has a thickness of about 12–25 microns and extends over a sufficient portion of the substrate to protect the sensor and heater elements but permits the soldering pads 22 and 24 of the conductors to remain exposed so that external electrical connection thereof may be accomplished. A low firing glass such as the commercial product DuPont 8185 is used so that damage to the thin film elements may be avoided. The preferred glass fires in a few minutes at a temperature of about 525° C. if desired, additional environmental protective materials may be applied over the glass.

After the sensor 10 has been constructed in the manner heretofore described, the sensor element 16 is trimmed (see FIG. 10) to the precise resistive value required for proper operation of the transducer. In the preferred embodiment, this is accomplished by laser-trimming in a well-known manner, commercial machines being readily available to perform this function.

The transducer 10 may now be utilized in any desired configuration such as the mass air flow sensing and control system described in the aforementioned U.S. Pat. No. 3,757,808. As described therein, two transducer elements are utilized, one of which is a temperature-sensing element and the other is a combined temperature-sensing element and heater. Changes in the electrical characteristics of the heated and unheated temperature-sensing elements may be used to compute the mass flow rate in a conduit. The improved transducer of this invention may be used for both the heated and unheated element. The unheated element is formed simply by permitting the heater 14 to remain unenergized. In this manner, structurally identical elements are formed so that the comparison of the response of the elements becomes more significant.

If it is desired to form a transducer having only a single resistive element, it will be readily apparent that such may be accomplished by omitting selected steps previously described. For example the formation of a sensor element 16 on substrate 12 would require only the steps described in connection with FIGS. 1, 2, 4, 6, 8 and 10.

A critical factor in the ability to construct the improved transducer element of this invention lies in the determination that a thin film resistive element may be formed in a direct electrical contact with thick film conductor elements. FIG. 12 illustrates the junction between a thick film conductor 20 and thin film sensor element 16. As shown, the nickel layer which had been deposited over the entire surface 12b and conductor 20 is removed by etching, leaving the element and a connecting ear 26 which overlaps the conductor 20. This manner of connecting thin and thick film elements, while not previously believed suitable or operative by those skilled in the art, has been found to be completely effective in providing direct electrical connection between a thick film conductive element and a thin film resistive element such that the best features of both types of elements can be provided without the difficult and expensive requirement of wire-bonding between thin and thick film circuit components.

While the transducer formation has been shown in connection with a specific transducer utilized for mass flow sensing, it is understood that this is by way of example only and not intended as a limitation on the scope of this invention. For example, such a transducer might be utilized for other purposes, such as pressure sensing. Further, the method of transducer construction of this invention may be applied to other devices wherein thin film elements may be suitably interconnected with thick film conductive elements.

I claim:

1. A method of making a transducer including a substrate having first and second surfaces, said method comprising the steps of:
    imprinting conductor means on said first and second surfaces;
    applying a thin film of a first material onto said first surface;
    applying a thin film of a second material onto said second surface;
    etching said first material to produce a thermal sensor conductively engaging said first surface conductor means; and
    etching said second material to produce a heater conductively engaging said second surface conductor means.

2. The method of claim 1 including the additional step of:
    applying an environmental protective coating to said thermal sensor and said heater.

3. A transducer made by a process comprising the steps of:
    preparing a substrate for metal deposition;
    imprinting conductor means onto a surface of said substrate;
    vapor depositing a layer of resistive material onto said surface;
    removing a portion of said material to produce a thin film device conductively engaging said conductor means;
    imprinting conductor means onto an additional surface of said substrate;
    vapor depositing a layer of resistive material onto said additional surface; and
    removing a portion of said additional surface material to produce an additional thin film device conductively engaging said additional surface conductor means.

4. The transducer of claim 3 made by the additional steps of:
    applying a glass-containing paste to said thin film devices; and
    firing the paste to form glass coatings on said thin film devices.

5. The transducer of claim 3 wherein said thin film device comprises a thermal sensor and said additional thin film device comprises a heater.

6. A transducer made by a process comprising the steps of:
    preparing a substrate for metal deposition;
    imprinting first and second pairs of conductor means onto first and second surfaces of said substrate, respectively;

vapor depositing a layer of resistive material onto said first surface covering said first conductor means;

vapor depositing a layer of resistive material onto said second surface covering said second conductor means;

removing a portion of said material from said first surface to produce a thin film resistance thermometer, portions of said resistive material being permitted to remain covering a portion of said first conductor means in intimate electrical contact therewith;

removing a portion of said material from said second surface to produce a thin film heater, a portion of said resistive material being permitted to remain covering a portion of said second conductor means in intimate electrical contact therewith;

laser trimming said thermal sensor to produce a desired resistive value for said sensor;

applying a glass-containing paste to said first and second substrate surfaces; and firing the paste to form a glass coating on said thermal sensor and said heater.

7. A method of making a transducer including a substrate having a first and second surfaces, said method comprising the steps of:

preparing a substrate for metal deposition;

imprinting first and second pairs of conductor means onto first and second surfaces of said substrate, respectively;

vapor depositing a layer of resistive material onto said first surface covering said first conductor means;

vapor depositing a layer of resistive material onto said second surface covering said second conductor means;

removing a portion of said material from said first surface to produce a thin film resistance thermometer, portions of said resistive material being permitted to remain covering said first surface conductor means in intimate electrical contact therewith;

removing a portion of said material from said second surface to produce a thin film heater, a portion of said resistive material being permitted to remain covering a portion of said second conductor means in intimate electrical contact therewith;

laser trimming said thermal sensor to produce a desired resistive value for said sensor;

applying a glass-containing paste to said first and second substrate surfaces; and firing the paste to form a glass coating on said thermal sensor and said heater.

8. A transducer made by a process comprising the steps of:

preparing a substrate for metal deposition;

imprinting conductor means onto a surface of said substrate;

vapor depositing a layer of resistive material onto said surface;

removing a portion of said material to produce a thermal transducer conductively engaging said conductor means;

applying a glass-containing paste to said thermal transducer; and firing the paste to form a glass coating on said thermal transducer.

* * * * *